United States Patent [19]

Latsch et al.

[11] 4,332,224
[45] Jun. 1, 1982

[54] INTERNAL COMBUSTION ENGINE WITH A MAIN COMBUSTION CHAMBER AND AN IGNITION CHAMBER

[75] Inventors: Reinhard Latsch, Vaihingen; Hans Schlembach, Mühlacker, both of Fed. Rep. of Germany

[73] Assignee: Robert Bosch GmbH, Stuttgart, Fed. Rep. of Germany

[21] Appl. No.: 141,506

[22] Filed: Apr. 18, 1980

Related U.S. Application Data

[63] Continuation of Ser. No. 894,966, Apr. 10, 1978, abandoned.

[30] Foreign Application Priority Data

Apr. 9, 1977 [DE] Fed. Rep. of Germany ....... 2715943

[51] Int. Cl.$^3$ ............................................. F02F 1/00
[52] U.S. Cl. ................................... 123/254; 123/260; 123/263; 123/293
[58] Field of Search .............. 123/254, 255, 260, 263, 123/268, 286, 293

[56] References Cited

U.S. PATENT DOCUMENTS

| | | | |
|---|---|---|---|
| 779,778 | 1/1905 | Hagar | 123/293 |
| 1,568,638 | 1/1926 | Summers | 123/293 |
| 2,171,929 | 9/1939 | Gazda | 123/254 |
| 2,855,908 | 10/1958 | Pflaum | 123/254 |
| 3,875,909 | 4/1975 | May | 123/262 |
| 3,982,504 | 9/1976 | Noguchi et al. | 123/293 |
| 3,999,530 | 12/1976 | Kunii | 123/268 |
| 4,029,072 | 6/1977 | Goto et al. | 123/143 B |
| 4,218,992 | 8/1980 | Latsch et al. | 123/293 |
| 4,300,497 | 11/1981 | Webber | 123/254 |

FOREIGN PATENT DOCUMENTS 2302015 7/1973 Fed. Rep. of Germany ...... 123/275

*Primary Examiner*—Craig R. Feinberg
*Attorney, Agent, or Firm*—Edwin E. Greigg

[57] ABSTRACT

An internal combustion engine is proposed with combustion chambers, comprising a main combustion chamber and an ignition chamber, the latter being connected to the main combustion chamber by at least one spill port, for the purpose of improving the ignitability of a relatively lean fuel mixture of an internal combustion engine. In this connection, the ignition chamber forms an elongated, closed cylinder wherein terminate spill ports from the main combustion chamber essentially radially and tangentially to the cylindrical wall of the ignition chamber, so that a turbulence is created in the medium introduced via the spill ports along the cylindrical walls of the ignition chamber, with a secondary swirl flowing back in the center. Thereby, a satisfactory separation of the freshly introduced medium from the residual gases remaining in the ignition chamber after the combustion is attained, thus providing optimum conditions for the ignition of the fuels utilized for operating the internal combustion engine.

19 Claims, 6 Drawing Figures

INTERNAL COMBUSTION ENGINE WITH A MAIN COMBUSTION CHAMBER AND AN IGNITION CHAMBER

This is a continuation, of application Ser. No. 894,966 filed Apr. 10, 1978 now abandoned.

BACKGROUND OF THE INVENTION

The invention is based on an internal combustion engine provided with combustion chambers, comprising a main combustion chamber and an ignition chamber, the latter being connected to the main combustion chamber by at least one spill port. In conventional internal combustion engines of this kind, there is the disadvantage, if the engines are operated with a fuel-air mixture which must be spark-ignited, that such fuel-air mixture, especially if it is maintained at a lean level, resists ignition in the ignition chamber, so that a non-uniform torque transmission of the internal combustion engine is produced. To obtain a sufficiently safe ignition and reaction of the operating media with one another at a minimum proportion of fuel, various methods have been employed. It is known in mixture-compressing internal combustion engines to provide for charge stratification, wherein a very lean mixture is introduced in a predominant quantity into the main combustion chamber while an ignition chamber, connected to the main combustion chamber by spill ports, is fed with a rich, ignitable mixture and the latter is ignited in this ignition chamber.

This application is related to the disclosure of Wossner U.S. Pat. No. 3,962,869, issued June 15, 1976; Feldman U.S. Pat. No. 3,604,503; and Grover U.S. Pat. No. 3,229,759, relating to heat pipes and heat transfer devices and the like which are incorporated herein by reference.

In another known process, the internal combustion engine is operated with a single, lean primary mixture and additional fuel to enrich the primary mixture and to attain ignitability is injected in an ignition combustion chamber in communication with the main combustion chamber via spill ports or firing channels. These aforementioned devices are all very complicated and expensive. Moreover, it is furthermore known to provide a precombustion chamber connected to the main combustion chamber by way of a single spill port and to set the main mixture in the main combustion chamber into a directional rotary motion to produce a certain stratification of the mixture due to centrifugal action. The heavy, fuel-rich mixture is forced, during the compression stroke, into the prechamber via the spill port so that residual gases from the previous combustion process are forced back into the chamber and a mixture which is more ignitable due to stratification is formed in the zone of the spill port. This mixture is ignited at the point by a spark plug in the conventional system.

However, this system does not insure a sufficiently stable turbulence formation in the combustion chamber, since this swirl, produced during the intake stroke, must be maintained until the end of compression. Therefore, in order to provide for a safe ignition process, it is still necessary to provide a mixture relatively greatly enriched with fuel, especially also during the warm-up period.

The arrangement of the spark plug in the spill zone has the disadvantage that a great deal of conversion of the fuel-air mixture takes place in the prechamber and, in addition to a reduction in the engine efficiency, the prechamber as well as the spark plugs are placed under a high thermal load. Also, it is impossible in this device to conduct measures improving the ignitability, as suggested in another patent application, such as an increase and control of the temperature of the prechamber wall to the close proximity of the point of auto ignition, and the correlation of the ignition spark, if the operating media are subject to spark ignition, with a non-turbulent laminar wall stream having a minimal flow velocity.

OBJECT AND SUMMARY OF THE INVENTION

The internal combustion engine of this invention has the advantage that even extremely lean fuel-air mixtures are safely ignited, above all also in the zone of low speeds and loads. Due to the configuration of the ignition chamber and the spill ports, a very stable rotary motion is imparted to the medium entering the ignition chamber during the compression stroke along the cylinder walls, and a high angular velocity is attained. As a result, a mixture of operating media relatively low in fuel, which is introduced into the combustion chambers, is subject to a good unmixing action so that in the marginal zones there is a fuel-enriched and readily ignitable mixture. At this point, this mixture is sufficiently preheated by the ignition chamber wall and thus ignitability is further improved. Also, by secondary swirls, any residual gases which are present are conveyed centrally along the cylindrical axis of the ignition chamber back to the outlet of the chamber. In this way, a fuel-rich mixture is obtained at the rear end of the ignition chamber and, after ignition of the operating media, a clearly directional flame jet is produced which extends from one or several spill ports or "firing channels" into the main combustion chamber. By the arrangement and distribution of the firing channels, it is possible to obtain an optimum and rapid ignition of the mixture in the main combustion chamber. In this connection, the invention furthermore offers the possibility of conducting additional measures improving ignitability, as they have been set forth, for example, hereinabove.

The ignition chamber of this invention affords the same aforementioned advantages also in connection with the other features mentioned above for charge stratification or to serve as a swirl chamber, in order to obtain an ignition chamber low in residual gas to introduce the combustion process.

The invention will be better understood as well as further objects and advantages thereof become more apparent from the ensuring detailed description of several preferred embodiments taken in conjunction with the drawings.

DESCRIPTION OF THE PREFERRED EMBODIMENTS

Figure 1:
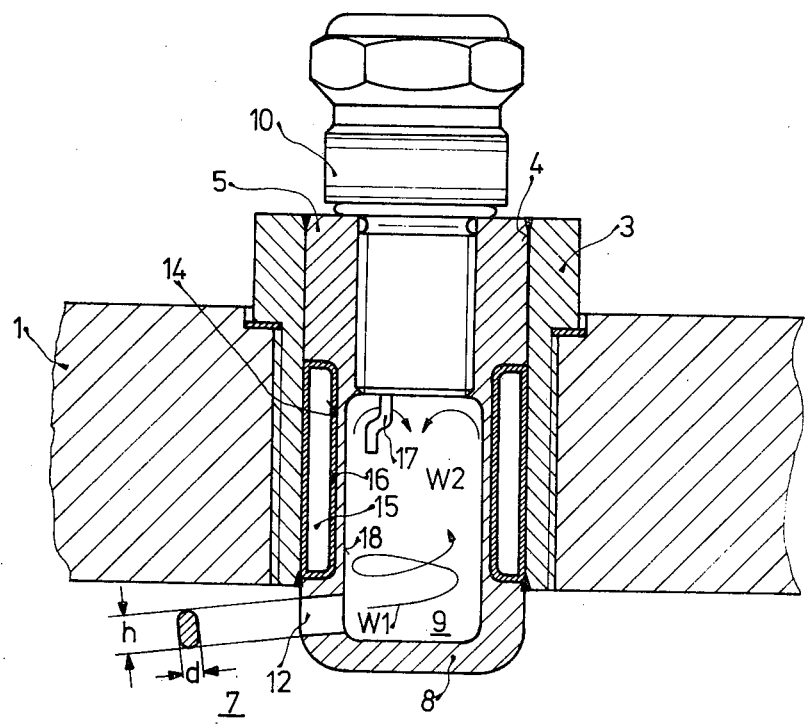
FIG. 1 shows a first embodiment with an ignition chamber, the wall temperature of which can be controlled by a heatpipe element.

Turning now the drawings, FIG. 1 shows a fragmentary view of a cylinder head wall 1 of an internal combustion engine. A threaded bushing 3 is threaded into this wall and an elongated cylindrical hollow member 5 is tightly fitted into the inner bore 4 of the bushing. The part 8 of the hollow member which extends into the main combustion chamber 7, is sealed at the end face. The interior of the hollow member 5 forms an elongated, cylindrical ignition chamber 9, while the end face of this chamber opposite to member 8 is constituted by a spark plug 10 threadedly inserted at that point coaxially to the axis of the cylindrical hollow member part 5. In the zone of the member 8 of the cylindrical, hollow member 5 extending into the combustion chamber, the hollow member 5 is provided with spill ports 12 which extend substantially radially relative to the cylindrical axis and these spill ports place the ignition chamber 9 in communication with the main combustion chamber 7. The axis of each of the spill ports 12 forms approximately an angle of 100° with the cylinder axis so that jets of gas exiting from the spill ports 12 can flow into the main combustion chamber 7 at a small angle unaffected by the cylinder head wall 1.

Figure 2:
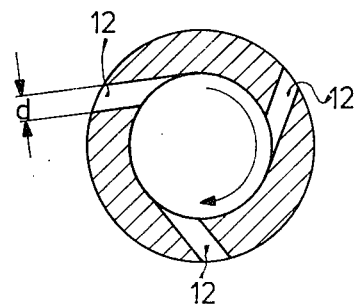
FIG. 2 shows a cross-sectional view through the ignition chamber of FIG. 1.

The spill ports 12 furthermore extend tangentially relative to the circumference of the ignition chamber 9 and the latter, as shown in FIG. 2, has three such spill ports 12 distributed at generally uniform angular spacings along the circumference. The cross section of the spill ports has a substantially oval shape so that the large, major diameter h is parallel to the cylindrical axis of the ignition chamber 9. One advantageous embodiment of the spill port cross section resides in that the ratio of the dimension h to the width d is about 1.5.

The cylindrical, hollow member 5 furthermore comprises an outer annular groove 14 and forms, together with the threaded bushing 3, an annular chamber extending essentially along the outer surface of the ignition chamber 9 and particularly in the zone of the end face of the threadedly inserted spark plug. This annular space is fashioned as a heatpipe element 15 and for this reason is lined, in the example shown herein, with a fine-mesh steel netting 16 which serves for the transport of the evaporator fluid which can be, for example, sodium. The spark plug 10 exhibits an electrode 17 whose counter electrode is the cylindrical wall 18 of the ignition chamber 9.

From the charge of a relatively lean fuel-air mixture introduced during an intake stroke of the internal combustion engine into the main combustion chamber 7, a portion is conveyed during the compression stroke from the main combustion chamber 9 via the spill ports 12 into the ignition chamber 9 and there ignited at the given instant of ignition. By the special configuration of the spill ports 12 and the shape of the ignition chamber 9, the mixture entering the ignition chamber is set into rotating motion while at the same time being adapted to a primary swirl W1 which is caused to rise at a high angular velocity along the cylindrical wall 18 toward the end of the swirl chamber on the side of the spark plug 10. Due to the fact that the entering mixture stream are oriented at an angle which deviates only slightly from a right angle to the cylinder axis of the ignition chamber 9, the primary swirl W1 possesses a strong radial component and only a minor component in the direction of the cylinder axis, so that high peripheral velocities are produced. Due to this high peripheral velocity, the fuel and air components are uniformly distributed, on the one hand, and an unmixing effect is attained, on the other hand, with the result that the introduced mixture is enriched with fuel in the zones of the ignition chamber close to the cylinder wall. Accordingly, a stratification, so to speak, is obtained of the charge fed into the ignition chamber 9.

By the rising primary swirl W1, the residual gases, which have remained in the ignition chamber from the preceding combustion process, are pushed upwardly toward the spark plug 10 and conveyed, via a secondary swirl W2, coaxially to the cylinder axis of the ignition chamber 9 downwardly in the direction toward the inlet into the ignition chamber. In this way, only the portion of the mixture enriched due to the centrifugal action on the relatively heavy fuel components enters the zone of the electrode 17, whereas the ignition-impeding residual gases are displaced.

This aforedescribed, directional movement of the enriched charge along the cylindrical wall 18 of the ignition chamber affords the further advantage that the charge can be heated up as it travels along the warm wall and has already reached a temperature closely below the self-ignition temperature even before reaching the electrode 17, during normal operation. This feature advantageously reduces the necessary energy for ignition and generally enhances ignitability. The electrode 17 of the spark plug is furthermore arranged so that the ignition spark jumps over to the cylindrical wall 18 in the region of the flow in close proximity to the wall. In this region of close proximity to the wall within the boundary layer, there exists laminar flow with a very low average velocity. The mixture which flows along in that zone is furthermore fuel-enriched and also well heated up due to its closeness to the wall. The heating up of the mixture in the marginal zones of the swirl is additionally increased by the so-called vortex tube or Rangue effect.[*] These three properties greatly promote the ignitability of the mixture so that even very lean mixtures can still be ignited with the use of a small amount of ignition energy.

[*]Rangue, G. J.: Experiments on expansion in vortex with simultaneous exhaust of hot air and cold air, Phys. Rad. 4 (1933), S. 112

By the ignition in the upper part of the ignition chamber 9, only a partial quantity of the mixture introduced into the ignition chamber is combusted in a particular case. The remainder of the mixture is pushed into the main combustion chamber 7 via the spill ports 12 by the charge which is combusted in the head of the chamber and thus is expanded. Due to the fact that a large portion of the charge is consequently at a relatively low temperature, the heat and throttling losses are reduced, above all also during the step of pushing the mixture into the main combustion chamber 7, as compared with the case wherein a mixture, ignitable in its entirety, is completely ignited in an ignition chamber. In this way, an improvement in fuel consumption and a satisfactorily smooth-running combustion engine are attained. The tendency to knock is diminished, so that the maximum torque is obtained with a markedly later ignition instant than customary. The fact that the directional swirl is strongly pronounced also suppresses the tendency toward the formation of hot spots as is the case in pre-chambers or swirl chambers with a non-directional entrance of the mixture, and therefore the tendency toward spontaneous ignition is avoided. The well-defined shape of the primary swirl W1 is also favored by the shape of the cross section of the spill ports 12; due to the form of these spill ports, which is elongated in the direction of the cylinder axis, a flow extending close toward the walls is obtained.

The heatpipe element 15 furthermore provided in this embodiment serves the purpose of rapidly attaining a desired operating temperature of the cylindrical wall 18 and then also controls this temperature so that the entering mixture is not heated above the spontaneous ignition temperature. In the warm-up phases of the internal combustion engine, the evaporating medium in the heatpipe element 15 may not yet commence evaporation if the cylindrical wall 18 of the ignition chamber 9 is initially cold. In this phase, the heatpipe element 15 has the function of an insulation preventing the heat transferred to the cylindrical wall 18 during the combustion process from being introduced immediately into the cooled parts of the cylinder head. The wide ring of the heatpipe element 15 offers an insulating gap. Only once the temperature of the wall 18 of the ignition chamber 9 has become so high that the operating temperature of the heatpipe element 15 is reached, the conventional heat transfer takes place to the cooled parts of the cylinder head; this heat transfer is greatly increased as compared to a normal heat conductance. The heatpipe element 15 is designed so that under the highest thermal load on the combustion chamber walls the amount of heat removed is just so much that the self-ignition temperature of the mixture entering the ignition chamber is not attained. In the cooled phases, the heatpipe element 15 then again takes over the insulating function, so that it is possible to control the temperature of the cylindrical wall 18 so that it is at a very uniform value. In a simplified arrangement, the temperature of the cylindrical wall 18 can also be controlled by providing an insulating gap, which decreases, with increasing temperature, to a width of zero, between the ignition chamber wall and the cooled parts of the internal combustion engine. Also, in this way it is possible to control the wall temperature of the ignition chamber 9, although at a lower flexibility than with the aid of the heatpipe element technique. Such an arrangement per se has been known in the prior art and need not be explained in detail herein.

The flame jets which exits at a small angle from the ignition chamber 9 can be oriented by the arrangement of the spill ports 12 so that they are, on the one hand, sufficiently remote from the cooled combustion chamber walls in the immediate surroundings, thus there is only minor flame quenching and the flame jets affect initially only small proportions of the charge in the main combustion chamber, accordingly, this obtains a continuously increasing pressure rise in the main combustion chamber and a desirable, smooth combustion process takes place. However, the flame jets furthermore are to be oriented so that they do not impinge at their ends on the end face of the combustion chamber. Thus, by the configuration and orientation of the spill ports, an optimization of the charge reaction in the main combustion chamber can be additionally effected.

Figure 3:
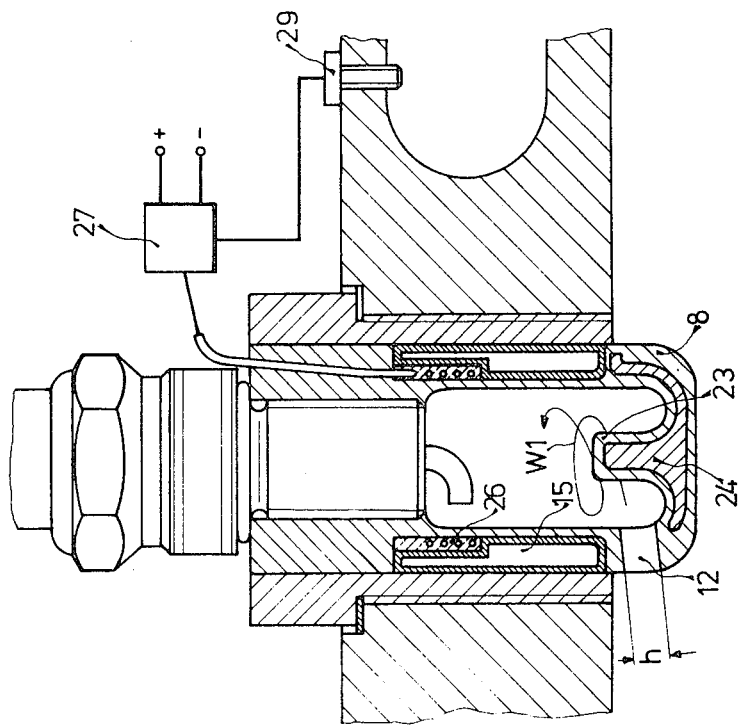
FIG. 3 shows a second embodiment of the invention.

The embodiment according to FIG. 3 is essentially of the same as the embodiment according to FIGS. 1 and 2 and thus the description of FIGS. 1 and 2 is incorporated by reference with respect to the identical components. In a deviation from the embodiment of FIG. 1, FIG. 3 provides a constriction 20 in the ignition chamber 9 arranged approximately in the center between the spill ports 12 and the termination of the ignition chamber 9 by the spark plug 10. This constriction has the effect that the rotary velocity of the primary swirl W1 is slowed down after passing the constriction 20 and thus the residence time of the mixture, already strongly stratified by that time, on the warm walls of the cylindrical chamber is increased and the mixture is well heated up and prepared to increase ignitability. The reduced rotary velocity furthermore improves the ignitability. By the constriction, an increase in the backflow speed is furthermore attained via the secondary swirl W2 in the axial direction. In this way, the return of the residual gas components and of lightweight, low-fuel components of the mixture is promoted so that a fuel-enriched mixture is present in the upper portion 21 of the ignition chamber 9 associated with the spark plug 10. Here again, as in the preceding embodiment, only a small portion of the charge introduced into the ignition chamber is being ignited, conveying the remaining, not yet ignited mixture components via the spill ports 12 again into the combustion chamber, and the actual combustion only commences at this point within the combustion chamber.

Figure 4:
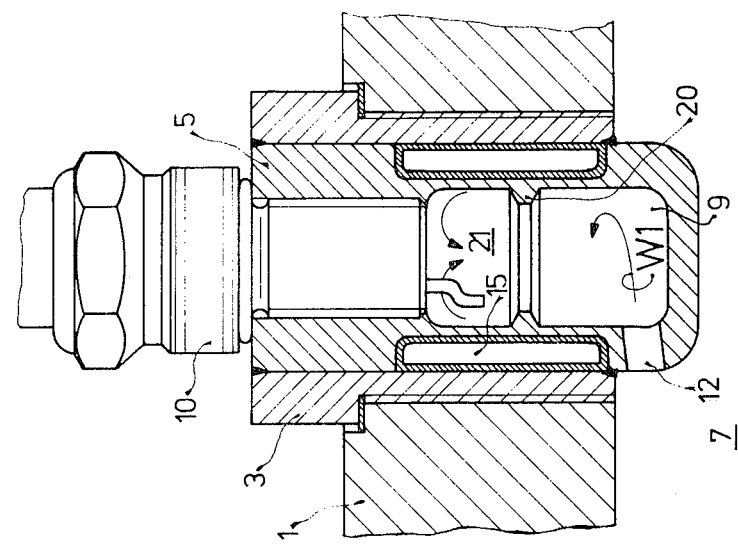
FIG. 4 shows a third embodiment of the invention with an auxiliary heating unit and a heat-controlled ignition chamber.

Also the embodiment of FIG. 4 corresponds in its basic design to the embodiment of FIG. 1. Identical parts bear identical reference numerals; reference is had to the description of FIG. 1 in connection with these parts. In a deviation from the embodiment of FIG. 1, a cylindrical pin 23 is adapted to extend into the ignition chamber 9 from the end face of the ignition chamber which faces the main combustion chamber 7. The pin 23 extends coaxially and has a length somewhat larger than the dimension h of the firing channels 12. Due to this pin 23, the mixture stream which enters chamber 7 via the spill ports 12 is provided with an improved alignment in the tangential direction so that the formation of a rapidly rotating swirl W1 is enhanced.

In its interior, the cylindrical pin has an insert 24 which possesses good head-conductive properties, so that also in this zone of the ignition chamber 9 the temperatures do not attain a level which creates a spontaneous ignition of the lean fuel mixture which, however, has not as yet been unmixed. The insert 24 can extend, for example, as shown in the embodiment of FIG. 4, along the entire lower area of member part 8 of the cylindrical hollow member 5 which projects into the combustion chamber 9 and can lead laterally to the cooled parts of the internal combustion engine. Advantageously, the insert can be made, for example, of copper or, with improved temperature control properties, in the form of a heatpipe element 15.

To be able to operate with a relatively lean fuel mixture already in the starting phase, it is advantageous to heat the cylindrical wall 18 in the zone of the ignition point. For this purpose, in the embodiment of FIG. 4, a heating unit 26 is connected in proximity to the heatpipe element 15 with this heating unit being supplies with electrical current from a switching device 27. The switching device 27 receives a control signal from a temperature sensor 29 which detects the operating temperature of the internal combustion engine. This can take place, for example, at the cylinder head or in the cooling medium of the internal combustion engine. When the operating temperature has been reached, the current supply to the heating unit 26 is interrupted via the switching device 27. Advantageously, for the exact control of the wall temperature, the heating unit can consist of a PTC material. In this material, with a constant supply voltage, the resistance rises greatly starting with a specific temperature so that, with the supply voltage remaining at the same value, the output of the heating unit is reduced. In this way, a self-regulating action is achieved and, with an appropriate selection of a suitable PTC resistance, the temperature of the cylindrical wall 18 near the point of ignition can be accurately controlled to be at a temperature below the spontaneous ignition temperature. Once the operating temperature of the internal combustion engine has been attained, the heating unit 26 can be switched off entirely.

Figure 5:
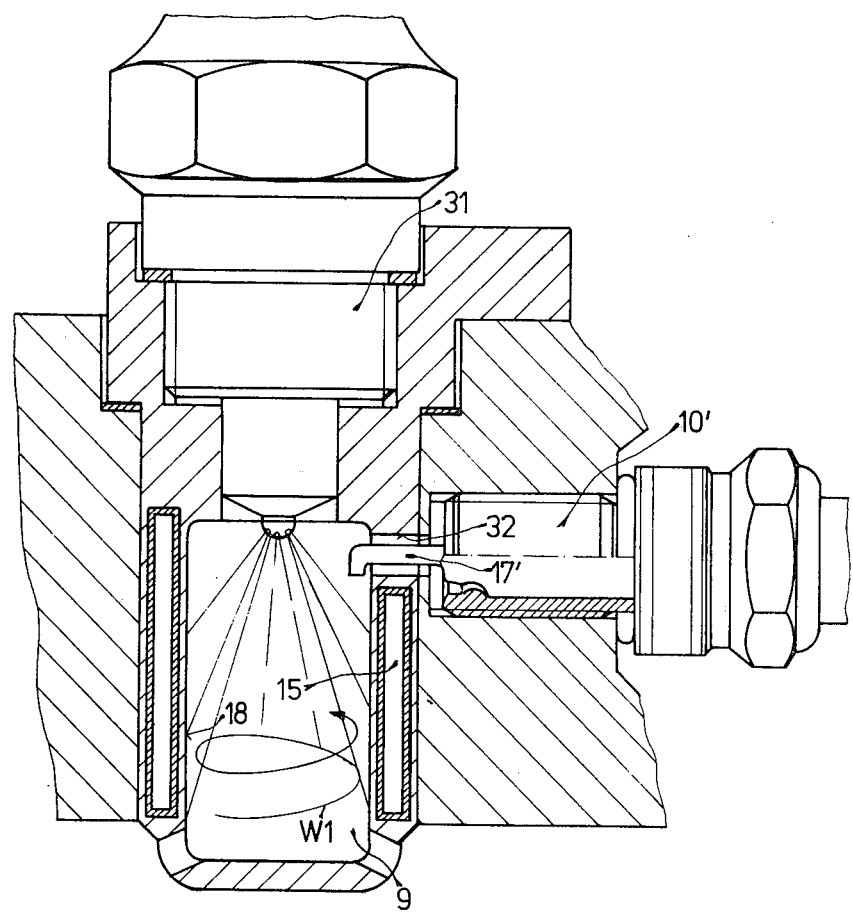
FIG. 5 shows a fourth embodiment of the invention with a device for adding further fuel.

The embodiment of FIG. 5 shows a modified version of the embodiment of FIG. 1. In this design, in place of the spark plug 10 as in the embodiment of FIG. 1, an injection nozzle 31 is threadedly inserted, by means of which in accordance with a conventional stratified charge concept additional fuel is injected into a very lean mixture to increase its ignitability. Advantageously, the additional fuel is sprayed in the direction toward the cylindrical wall 18 of the ignition chamber 9, from where the fuel, insofar as it has not as yet evaporated and been absorbed by the entering mixture, is removed by the main swirl W1 which in this case is likewise greatly pronounced and is conveyed toward the end of the ignition chamber 9 on the injection nozzle side. The wall temperature of the cylindrical chamber wall 18, controlled by the heatpipe element 15, enhances the preparation of the mixture and, by heating the stratified mixture, also increases its ignitability. At the uppermost end close to the injection nozzle 31, the ignition chamber has a radial perforation 32 through which an electrode 17' of the spark plug 10' extends into the ignition chamber 9 and there has as its counter electrode the cylindrical wall 18 of the ignition chamber 9. The advantages recited in the aforementioned examples also are true for this application to stratified charge operation with additional fuel injection into an ignition chamber. Also in case of self-igniting internal combustion engines, the configurations of the ignition chamber 9 as set forth in the above embodiments exhibit substantial advantages. Here, too, the residual gases, which impair the ignitability, are returned by means of a secondary swirl, and the entering air is rapidly heated to an optimum temperature on the cylindrical wall 18. The fuel particles impinging at the instant of injection on the cylindrical wall 18 are here optimally prepared for auto ignition. In place of the spark plug shown in FIG. 5, it is possible in this case to provide a glow plug for the cold start.

Figure 6:
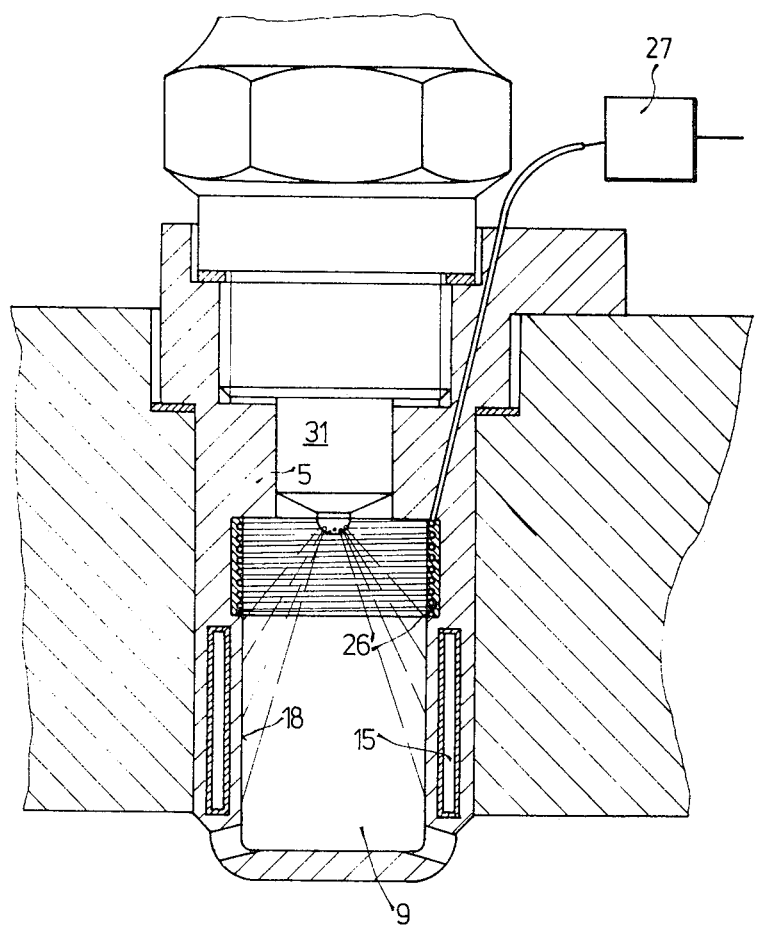
FIG. 6 shows a fifth embodiment of the invention in conjunction with an internal combustion engine with auto ignition.

FIG. 6 represents an embodiment of the ignition chamber for use in internal combustion engines with auto ignition. Here, the ignition chamber is of essentially the same construction as, for example, in the embodiment of FIG. 5. The injection nozzle 31 provided herein is an injection nozzle for diesel engines. As a supplement to the arrangement of FIG. 5, the embodiment of FIG. 6 comprises a heating unit 26' in the form of a heating coil inserted in the upper portion, close to the injection nozzle, of the cylindrical wall 18 of the ignition chamber and controlled by a switching device 27 in accordance with the disclosure of the embodiment of FIG. 4. The resistor material of the heating coil here again also can be a PTC material. There is no need to provide a glow plug, as mentioned above, since the heating coil takes over the function of an ignition means. At the same time, the heating up of the ignition chamber wall can be advantageously shortened by engine combustion gases in the warm-up phase of the internal combustion engine, supported by the heatpipe element 15, and it is possible to obtain a combustion which favors the smooth operation of the internal combustion engine with optimum fuel conversion.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. An internal combustion engine provided with combustion chambers, comprising a main combustion chamber and an ignition chamber, the latter being connected to the main combustion chamber by at least one spill port, further wherein the ignition chamber constitutes an elongated closed cylinder with a plane front wall and cylindrical wall only a small portion of said cylindrical wall extends into the main combustion chamber between a wall confining the ignition chamber and the adjacent cooled parts of the internal combustion engine surrounding the ignition chamber, at least one hollow space having a capillary structure within inner walls formed in said ignition chamber with capillary spaces filled with a vapourable medium and which are enabling by their capillary forces, condensated parts of said medium to be transported from cooler parts of said hollow space to hotter parts of said hollow space, said cylindrical wall further being penetrated by at least one spill port which extends essentially in a plane perpendicular to an axis of said closed cylinder and tangentially relative to the circumference of said cylindrical wall, this spill port being arranged to branch off toward the main combustion chamber, so as to be adequate for positioning said spill port to optimally provide for introduction of a flame jet exiting through said spill port into the remnant charge in said main combustion chamber, said ignition chamber further being arranged to receive a spark ignition means comprising a first electrode spaced adjacent to and insulated from said ignition chamber, the cylindrical wallthereof forming a second electrode of said ignition means defining a spark gap between said first electrode and said cylindrical wall.

2. An internal combustion engine according to claim 1, wherein said spill port has a cross section which is essentially oval and wherein the major diameter of said spill port extends in parallel to the cylinder axis of the ignition chamber.

3. An internal combustion engine according to claim 1, wherein said ignition combustion chamber is arranged to receive a fuel injection nozzle.

4. An internal combustion engine according to claim 1, wherein said ignition chamber comprises a constricted area which subdivides said ignition chamber into an upper portion associated with an ignition point and into a power portion associated with said spill port.

5. An internal combustion engine according to claim 1, wherein said ignition chamber is constituted by an elongated, cylindrical hollow member which can be threadedly inserted in said main combustion chamber wall of said internal combustion engine.

6. An internal combustion engine according to claim 5, wherein said ignition chamber further comprises an elongated cup-like receptacle having an open end arranged to receive a spark plug.

7. An internal combustion engine according to claim 5, wherein said ignition chamber further comprises an elongated cup-like receptacle having an open end arranged to receive an injection nozzle.

8. An internal combustion engine according to claim 5, wherein said hollow member comprises said vaporable medium within an annular groove arranged to receive a capillary netting of a heatpipe element.

9. An internal combustion engine according to claim 1, wherein said plane front wall includes a corner portion that projects into said main combustion chamber and further includes an upstanding pin means.

10. An internal combustion engine according to claim 9, wherein said lower portion of said plane front wall and said pin further include heat conducting means.

11. An internal combustion engine according to claim 10, wherein said heat conducting means is copper.

12. An internal combustion engine according to claim 10, wherein said heat conducting means consists of a heatpipe element.

13. An internal combustion engine according to claim 1, wherein said cylindrical wall further includes an annular zone, the heat conductivity of which can be controlled in dependence on the temperature of said internal combustion engine.

14. An internal combustion engine according to claim 13, wherein said zone further includes a gap, the width of which can be reduced with increasing temperature.

15. An internal combustion engine according to claim 13, wherein an electrical heating unit is arranged in proximity to said annular zone.

16. An internal combustion engine according to claim 15, wherein said heating unit comprises a PTC resistor.

17. An internal combustion engine according to claim 16, wherein said heating unit further includes temperature sensing means which are operational in dependence on operating temperatures of said internal combustion engine.

18. An internal combustion engine according to claim 15, wherein said heating unit further includes temperature sensing means which are operational in dependence on operating temperatures of said internal combustion engine.

19. An internal combustion engine according to claim 18, wherein said heating unit can be used as an ignition device for the cold start in compression igniting internal combustion engines.

* * * * *